United States Patent [19]

Hilby et al.

[11] Patent Number: 5,127,747
[45] Date of Patent: Jul. 7, 1992

[54] BEARING ASSEMBLY SPEED SENSOR

[75] Inventors: James A. Hilby, Watertown, Conn.; Denis Alff; Christian Hajzler, both of Annecy, France

[73] Assignee: The Torrington Company, Torrington, Conn.

[21] Appl. No.: 769,655

[22] Filed: Oct. 2, 1991

Related U.S. Application Data

[60] Division of Ser. No. 661,362, Mar. 11, 1991, Pat. No. 5,080,500, which is a division of Ser. No. 576,105, Aug. 29, 1990, Pat. No. 5,046,867, which is a continuation of Ser. No. 422,189, Oct. 16, 1989, abandoned.

[51] Int. Cl.⁵ .......................... F16C 19/08; G01P 3/48
[52] U.S. Cl. ................... 384/448; 324/207.25; 310/168
[58] Field of Search ................ 384/448; 310/168, 155; 324/207.25, 166, 173, 174

[56] References Cited

U.S. PATENT DOCUMENTS

| 3,936,684 | 2/1976 | Anselmino et al. | 310/168 |
| 4,037,690 | 7/1977 | Fisher et al. | 310/168 X |
| 4,667,156 | 5/1987 | Machino et al. | 324/173 |
| 4,783,180 | 11/1988 | Hayashi | 384/448 |
| 4,795,278 | 1/1989 | Hayashi | 384/448 |
| 4,864,231 | 9/1989 | Okumura et al. | 324/173 |

Primary Examiner—Thomas R. Hannon
Attorney, Agent, or Firm—John C. Bigler; Michael H. Minns

[57] ABSTRACT

A bearing assembly comprises an outer race with an outwardly projecting flange and an inner race with a similar outwardly projecting flange. A sensor assembly is mounted on the flange of the stationary race, and an encoder is mounted on the flange of the rotating race. Several sensor assembly and encoder configurations are included.

15 Claims, 7 Drawing Sheets

BEARING ASSEMBLY SPEED SENSOR

This is a divisional application under 37 CFR 1.60, of pending prior application Ser. No. 661,362 filed on Mar. 11, 1991, which is a divisional application of pending prior application Ser. No. 576,105 filed on Aug. 29, 1990, now U.S. Pat. No. 5,046,867, which is a continuation of application Ser. No. 422,189 filed on Oct. 16, 1989, now abandoned.

BACKGROUND OF THE INVENTION

This invention relates to a bearing assembly having means for sensing the rotational speed of a rotatable shaft; more particularly, it relates to bearing assemblies with inner and outer races having outwardly projecting flanges. The sensor assembly and encoder are mounted to the flanges so that the sensor is stationary and the encoder is mounted to the rotatable race. This invention is especially well-suited for use in the wheel bearings of automobiles.

As the automotive industry becomes more competitive, more emphasis is placed on getting better fuel economy and lowering the costs of material and labor. Wheel bearings are being modified to cost less, to be more compact in size, to be lighter in weight, and to provide more functions than existing components. With increased emphasis on anti-lock braking systems and suspension systems development, the wheel bearing is being looked at even more closely.

Prior art patents disclose structures which include a sensor assembly and an encoder-type component in a bearing assembly for use with an automobile wheel bearing assembly. An example of this type of prior art is included in U.S. Pat. No. 4,795,278 for a "Bearing Assembly" issued in the name of Yoshitaka Hayashi on Jan. 3, 1989. Other prior art patents disclose the incorporation of seals in the bearing assembly. An example of this type of prior art is disclosed in U.S. Pat. No. 3,772,549 for a "Wheel Speed Sensor" issued in the name of James C. Cumming on Nov. 13, 1973.

Other examples of the prior art are disclosed in the following U.S. Patents. U.S. Pat. No. 4,667,156 for a "Vehicle Wheel Bearing Mounted Pulser" issued in the names of Takami Machino Machino and Akira Kikuchi on May 19, 1987, discloses a geartooth configuration for the encoder, as well as several ways to mount the encoder to a bearing race. Also, U.S. Pat. No. 4,783,180 for a "Bearing Assembly For Vehicle" issued in the name of Yoshitaka Hayashi on Nov. 8, 1988, discloses an annular member (e.g., 54 in FIG. 1) on which an encoder component is mounted.

The primary problem with the prior art is that the addition of a sensor assembly and an encoder has been made at the expense of some of the other important factors discussed above. For example, some designs require additional axial bearing length relative to a wheel bearing with no speed sensing capability. Other bearing assembly/sensor assembly/ encoder configurations require relatively complex assembly procedures which tend to increase the labor costs associated with those wheel bearing designs. Some designs require a relatively elaborate adjustment of the position of the sensor assembly relative to the encoder in order to ensure a proper speed signal is provided. The prior art fails to disclose several bearing assembly/ sensor assembly/encoder configurations which are desirable from a manufacturing point of view, or for reasons of material and labor costs. Certain configurations which provide a minimal envelope, or volume, for the components are not disclosed.

The foregoing illustrates limitations known to exist in present bearing assembly speed sensors. Thus, it is apparent that it would be advantageous to provide an alternative directed to overcoming one or more of the limitations set forth above. Accordingly, a suitable alternative is provided including features more fully disclosed hereinafter.

The bearing assembly of the present invention incorporates these advantages in unique configurations which combine a sensor assembly and encoder with a bearing assembly to optimize the envelope volume and minimize costs. Briefly described, the bearing assembly of this invention comprises a stationary race with an outwardly projecting flange, a rotatable race with an outwardly projecting flange, a sensor assembly mounted on the stationary race, and an encoder mounted on the rotatable race. The axial space between the two flanges is utilized as efficiently as possible. The configurations resulting from the various mounting means are unique relative to the prior art cited above, and provide substantial cost and size advantages over the prior art.

The foregoing and other aspects will become apparent from the following detailed description of the invention when considered in conjunction with the accompanying drawing figures.

BRIEF DESCRIPTION OF THE DRAWING FIGURES

In the various figures, like parts are referred to by like numbers.

DETAILED DESCRIPTION

Figure 1:
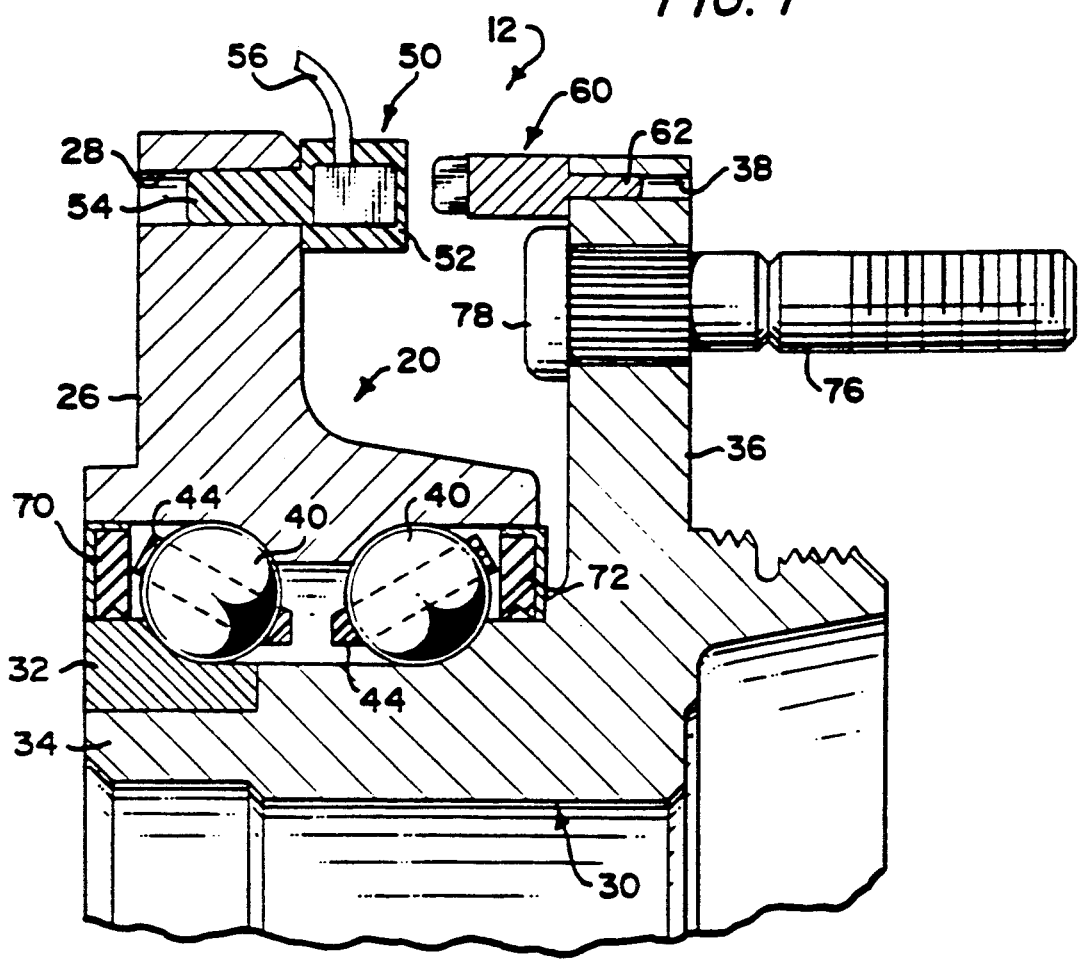
FIG. 1 is a sectional view of a bearing assembly having a sensor assembly and encoder mounted in bores in ar outer race flange and an inner race flange, respectively.

Turning first to FIG. 1, a bearing assembly 12 comprises an outer stationary race 20, an inner rotatable race 30, multiple rolling elements or balls 40 in a retainer 44, a sensor assembly 50, an encoder 60, and seals 70 and 72. Inner race 30 comprises two members, an inboard member 32 and an outboard member 34. This configuration facilitates loading of the balls 40 into the bearing assembly 12 during the manufacturing process. Multiple lug studs 76 are oriented axially through bores in a flange 36 which projects radially outwardly from member 34 of inner race 30. Sensor assembly 50 is configured to be mounted in an aperture 28 in a flange 26 which projects radially outwardly from outer race 20. Encoder 60 is axially separated from sensor assembly 50, and has at least one protrusion 62 mounted in a matching aperture 38 in flange 36. Apertures 38 are located radially outwardly of lug studs 76. Preferably, at least two protrusions 62 are utilized in order to ensure positive positioning of encoder 60 relative to flange 36.

The encoder 60 can take several forms; for example, where the sensor assembly 50 utilizes a variable-reluctance type sensor, the encoder 60 would normally have a gear tooth configuration. Alternatively, if the sensor assembly 50 utilizes a Hall-effect type sensor, the encoder 60 could have a smooth annular configuration as shown in cross-section in FIG. 1, with alternating North and South poles magnetized into the encoder 60. Throughout the specification of the invention, whenever the term "encoder" is used, the term refers to any alternative configuration such as the examples given above.

Likewise, the sensor assembly 50 can have many possible configurations, such as the gear-tooth or Hall-effect sensor types discussed above. Therefore, the term "sensor assembly" anywhere in the specification will refer to any of the possible configurations.

The bearing assembly of FIG. 1 has a unique configuration for holding sensor assembly 50 and encoder 60 in axial alignment so as to produce a speed signal proportional to the speed of a rotatable shaft (not shown) connected to rotatable inner race 30. Since encoder 60 is nonrotatably mounted on inner race 30, the rotational speed of encoder 60 is equal to the rotational speed of the shaft (e.g., an automobile wheel axle). A sensor or detector 52 would normally be positioned within assembly 50 as close as possible to the encoder 60. An output signal lead 56 connects the output signal from sensor 52 to other components, as desired (e.g., a microprocessor). The remaining portion of the sensor assembly, mounting structure 54, provides means for mounting the sensor 52 so as to maintain the proper relative positioning between encoder 60 and sensor 52. Also, additional signal processing circuitry, such as an adaptive threshold circuit mounted on an integrated circuit chip, could be incorporated into mounting structure 54 or sensor 52, if desired.

Rolling elements or balls 40 are arranged in two annular rows between outer and inner races 20 and 30. Although balls are shown in all the drawings, other types of rolling elements, such as tapered rollers or spherical rollers, could be substituted without affecting this invention. A plain bearing with no rolling elements could also be utilized.

Seals 70 and 72 enclose the balls 40 and keep out water, dirt, and other extraneous matter from the rolling elements; in addition, the seals 70 and 72 can function to keep grease inside the seals for lubrication of the rolling elements.

The lug studs 76 can be used to fasten flange 36 of inner race 30 to the wheel hub of an automobile, for example. If used in this manner, the head 78 of stud 76 shown in FIG. 1 would be located on the inboard end of the stud, and the threaded end of stud 76 would be located on the outboard end of the stud. One of the considerations in this invention is the positioning of the sensor assembly and encoder in the bearing assembly in a manner which allows the possibility of removing the lug studs 76 from flange 36 for maintenance work. Therefore, the bearing assembly sectional views shown herein all include a lug stud 76 in order to assist the reader in visualizing the removal of the stud 76 from flange 36. Whereas the sensor assembly 50 in FIG. 1, or any of the other drawings, may appear to be in a position to interfere with the stud removal, it should be noted that a specific lug stud to be removed can be easily rotated away from the sensor assembly by rotating inner race 30. The lug stud 76 can then be removed without interference from the sensor assembly 50.

Figure 2:
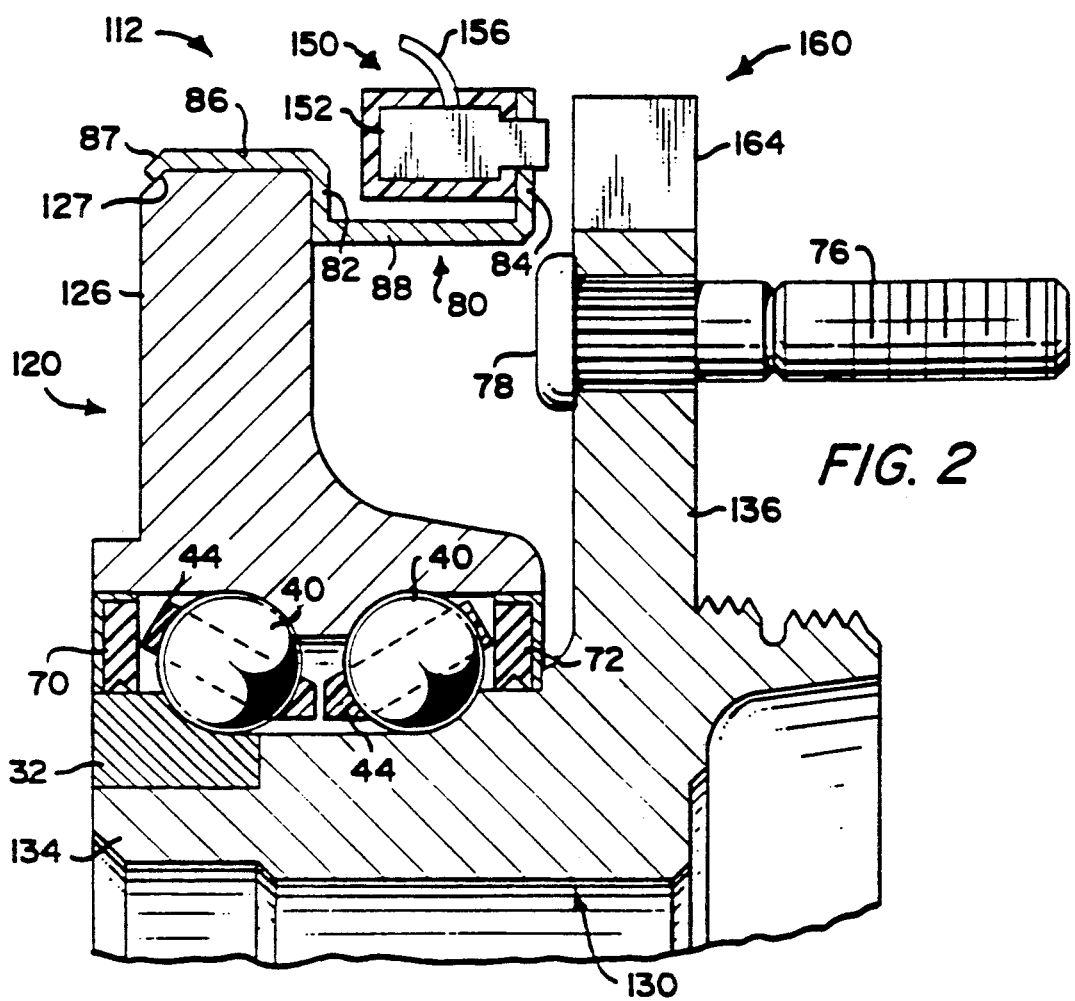
FIG. 2 is a sectional view of a bearing assembly with a sensor assembly mounted on a carrier ring attached to an outer race flange, and an encoder consisting of gear teeth formed in the outer periphery of an inner race flange.
Figure 3:
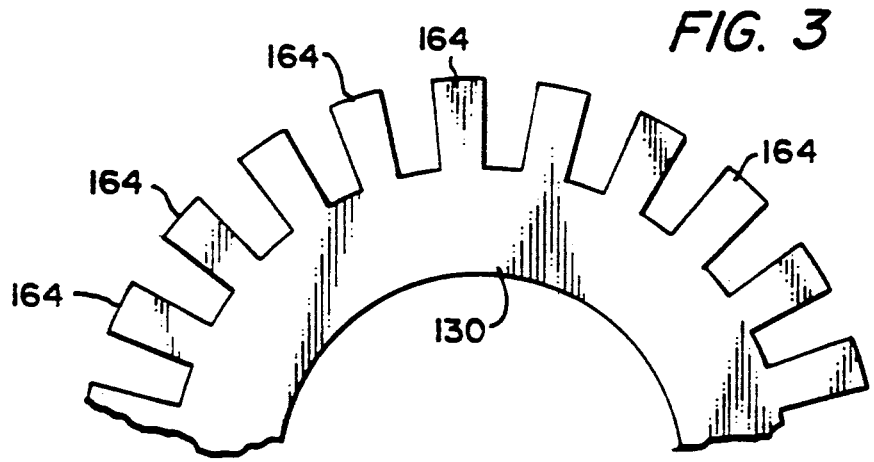
FIG. 3 is a fragmentary axial end view of the encoder shown in FIG. 2, taken along 3—3 in FIG. 2.

Turning now to FIGS. 2 and 3, a bearing assembly 112 has an encoder 160 which is an integral part of a flange 136. Encoder 160 comprises a plurality of gear teeth 164 formed in the outer periphery of the flange 136. FIG. 3 illustrates the axial view of the gear teeth 164. A sensor assembly 150 is axially separated from encoder 160, and is supported by a first carrier ring 80 having inboard and outboard radial portions 82 and 84, respectively, and inboard and outboard axial portions 86 and 88, respectively. Inboard portions 82 and 86 are attached to the outer portion of a flange 126. Portion 86 covers the outer peripheral surface of the flange 126, and has an inboard axial edge 87 which is bent over a chamfered edge 127 on the outer surface of flange 126. The sensor assembly 150 is mounted in the outboard radial portion 84 of carrier ring 80, with the sensor or detector portion 152 projecting axially through an aperture in portion 84 in radial alignment with the gear teeth 164. Both sensor assembly 150 and encoder 160 are radially outward of the luq stud 76.

Figure 4:
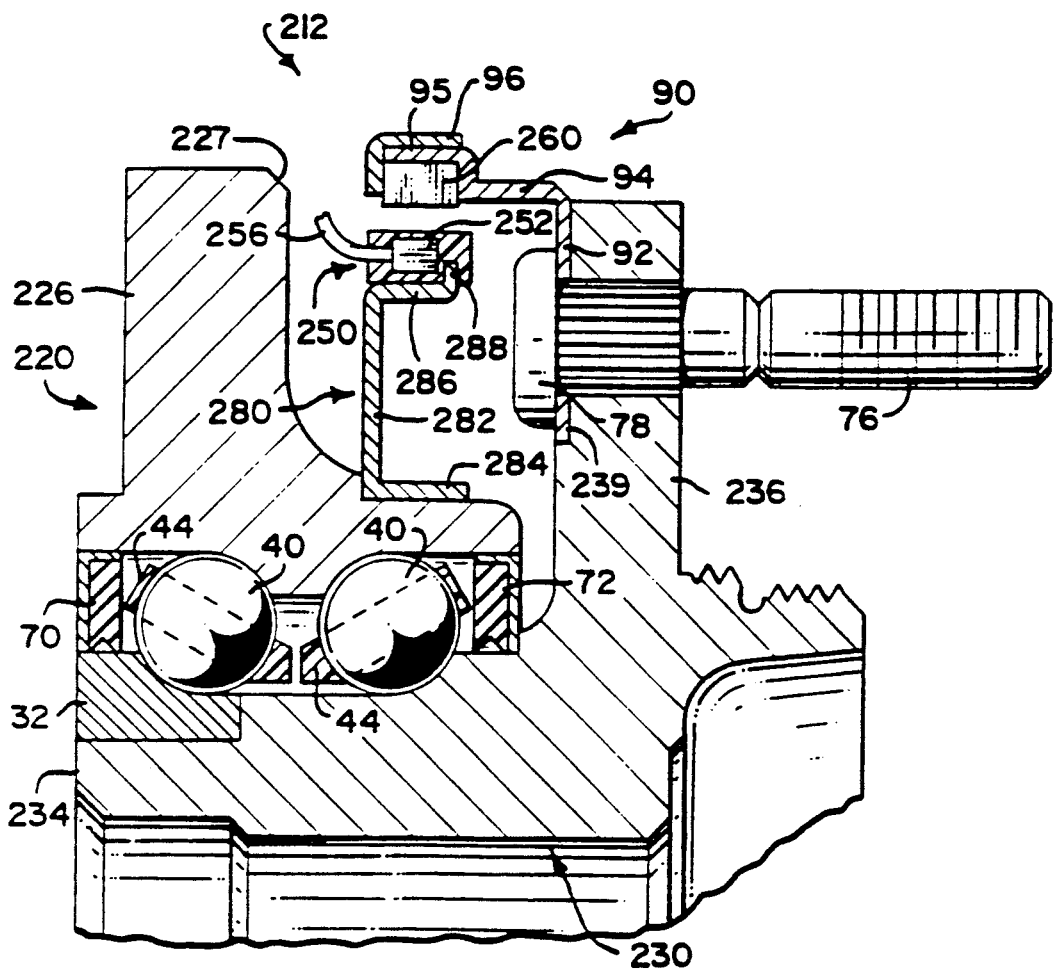
FIG. 4 is a sectional view of a bearing assembly with a sensor assembly mounted on a first carrier ring attached to an outer race flange, and an encoder mounted radially outwardly of the sensor assembly on a second carrier ring which is attached to an inner race flange.

Turning now to FIG. 4, a bearing assembly 212 has a sensor assembly 250 mounted on a first carrier ring 280 having a radial portion 282 which connects two concentric axial portions 284 and 286. Inner portion 284 is press fit onto the outer surface of outer race 220 so as to mount ring 280 to bearing assembly 212

Outer axial portion 286 has an outwardly extending flange 288 which helps support sensor assembly 250 in the proper position relative to encoder 260. A second carrier ring 90 is mounted to a flange 236, and has a radial portion 92 and an axial portion 94. Encoder 260 is held in place by an outward indentation 95 in portion 94 and by a cup member 96 which is bent around the outer peripheral surface of the indentation 95 so as to enclose encoder 260. The radial portion 92 of carrier ring 90 has multiple holes to accommodate the lug studs 76 which hold the carrier ring 90 in place circumferentially and axially. Positive radial placement of the carrier ring 90 is ensured by a recess 239 in flange 236. A chamfered edge 227 on the outboard side of the outer surface of flange 226 helps minimize chafing of the output signal lead 256.

Figure 5:
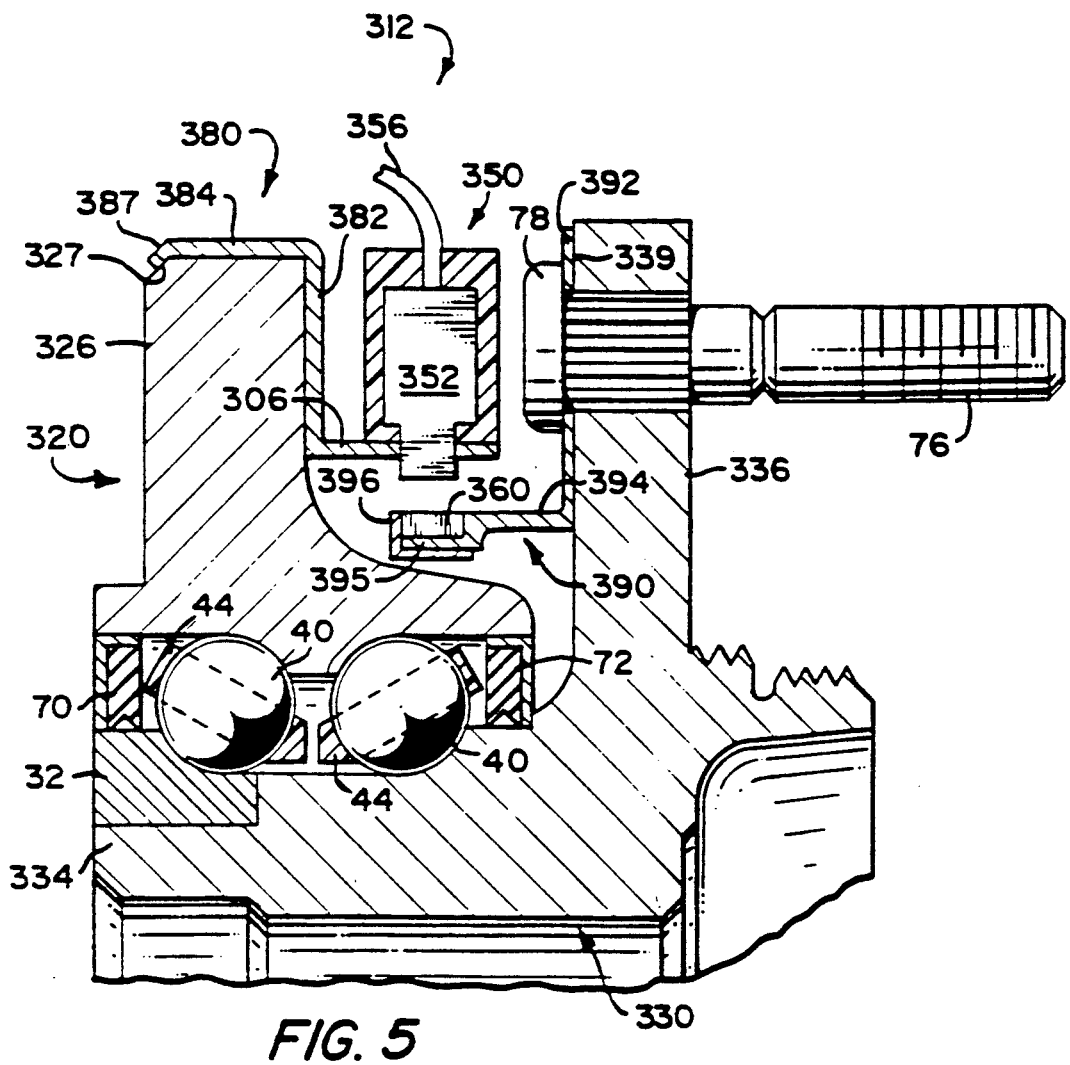
FIG. 5 is a sectional view of a bearing assembly similar to the assembly shown in FIG. 4, except that the encoder is mounted radially inwardly of the sensor assembly.

Turning now to FIG. 5, the bearing assembly 312 comprises the same basic components shown in FIG. 4. The primary difference between the configurations shown in FIGS. 4 and 5 is the second carrier ring. In FIG. 4, carrier ring 90 is oriented so as to position encoder 260 radially outwardly of the sensor assembly 250, whereas in FIG. 5 the second carrier ring 390 holds encoder 360 radially inwardly of the sensor assembly 350. FIG. 5 illustrates similar means for attaching carrier ring 390 to flange 336, including the heads 78 of multiple lug studs 76 and a recess 339 to positively position ring 390 relative to the flange 336. First carrier ring 380 has a radial portion 382 which connects an inboard axial portion 384 to an outboard axial portion 386. Portion 384 has an inboard edge 387 which is bent over chamfered edge 327 of flange 326.

Figure 6:
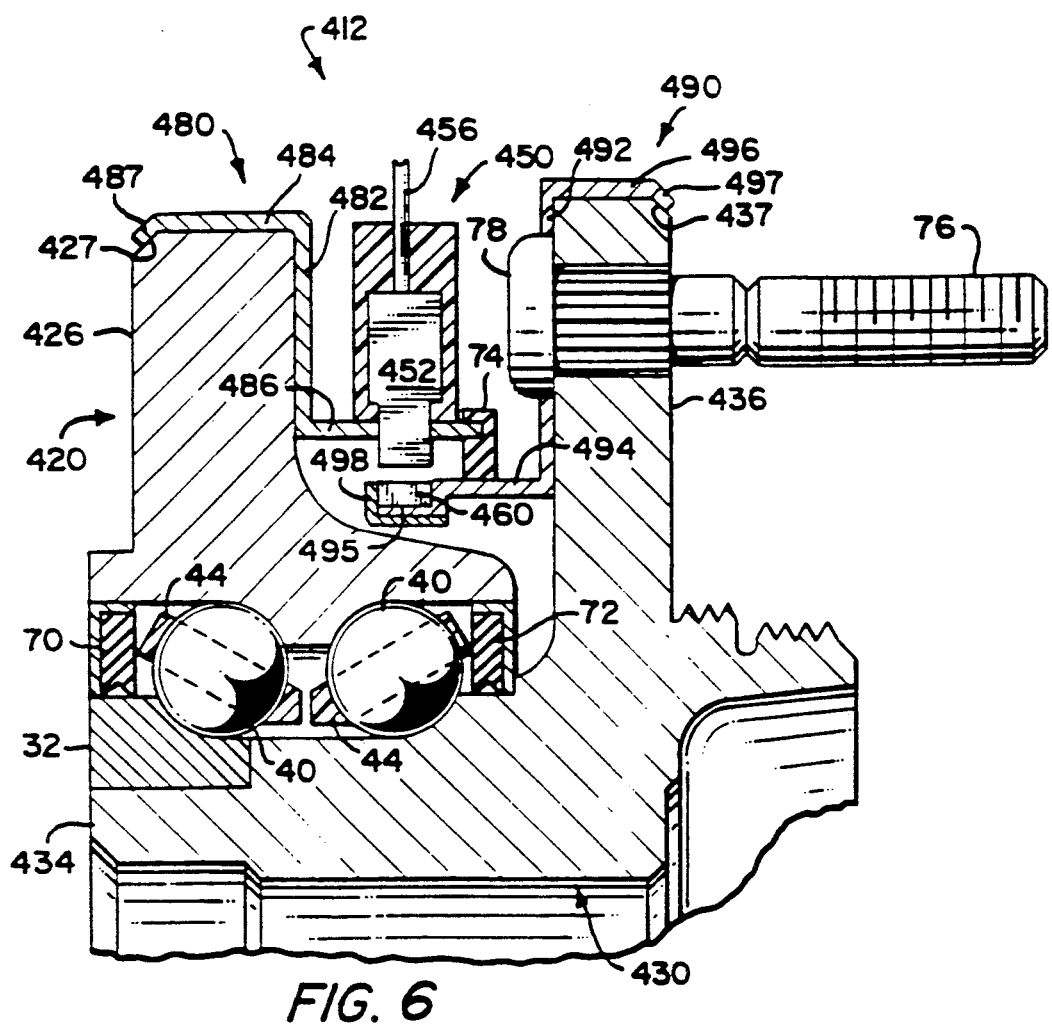
FIG. 6 is a sectional view of a bearing assembly similar to the assembly shown in FIG. 5, except that a portion of the second carrier ring is bent over the outer peripheral surface of the inner race flange, and an additional seal is positioned between the two carrier rings.

Turning now to FIG. 6, a bearing assembly 412 is shown which is similar to bearing assembly 312 in FIG. 5. The primary difference is the addition of a seal 74. A second carrier ring 490 has a modified configuration. First carrier ring 480 provides mounting means for a sensor assembly 450 and has a radial portion 482 which connects an inboard axial portion 484 and an outboard axial portion 486. Second carrier ring 490 has a radial portion 492 which connects an inboard axial portion 494 and an outboard axial portion 496.

Portion 494 has a radially inwardly projecting indentation 495 which holds encoder 460 with the help of a cup member 498, similar to the manner in which encoder 360 is held in place in FIG. 5. Outboard portion 496 is bent over the outer peripheral surface of flange 436, and has an outboard axial edge 497 which bends over chamfered edge 437 of flange 436. Seal 74 is attached to the outboard end of portion 486 of first carrier ring 480. Portion 486 axially overlaps the inboard axial portion 494 of second carrier ring 490 enough to allow seal 74 to extend radially inwardly and make a sliding contact with the outer peripheral surface of portion 494. Second carrier ring 490 is held in place by portion 496; alternatively, the heads 78 of lug studs 76 could be used to hold ring 490 in place, or they could serve as an additional attachment means.

Figure 7:
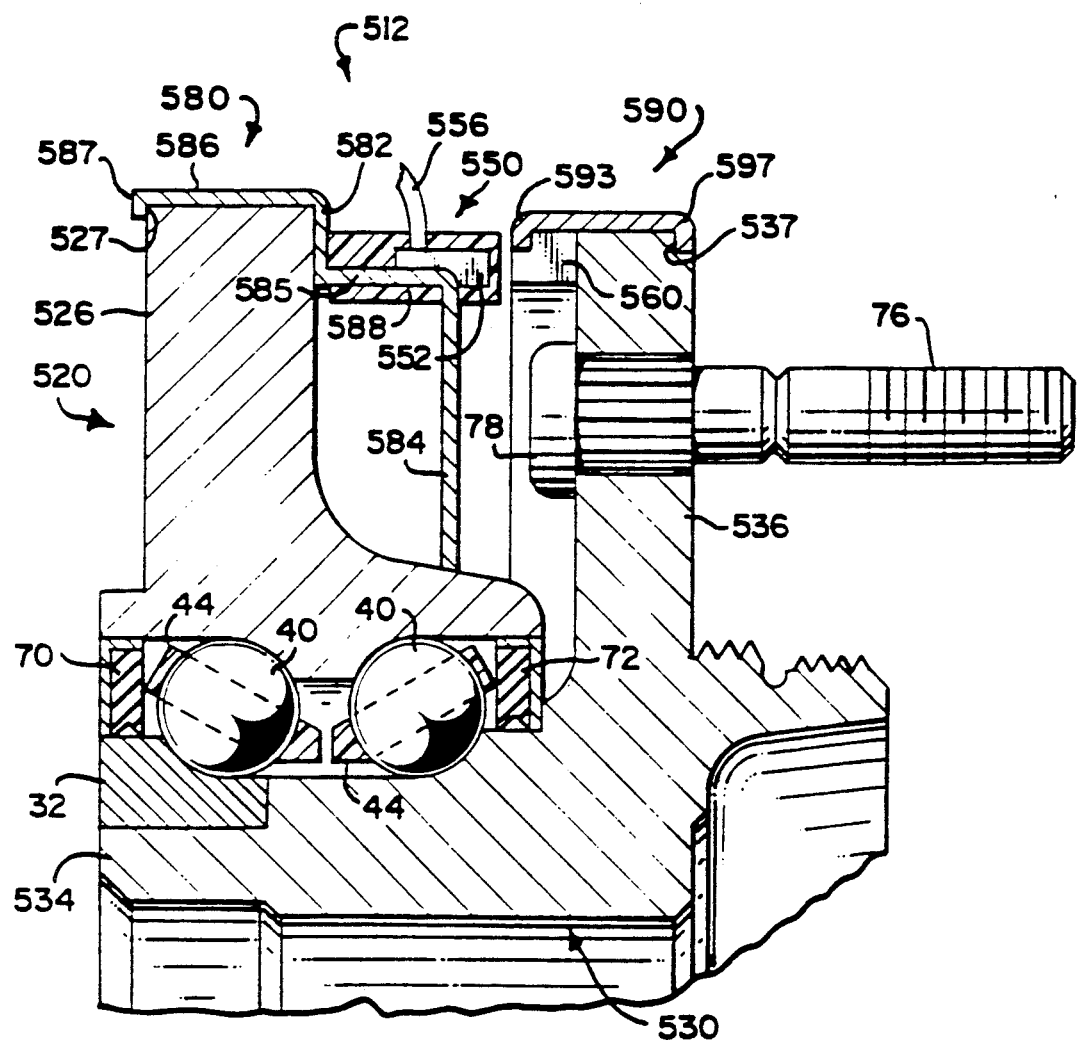
FIG. 7 is a sectional view of a bearing assembly having a sensor assembly and an axially-separated encoder mounted radially outwardly of multiple lug studs on carrier rings attached to outer and inner race flanges, as in FIGS. 4–6.

Turning now to FIG. 7, the bearing assembly 512 comprises the same basic components shown in FIG. 5, with modified carrier rings 580 and 590. Sensor assembly 550 is mounted horizontally so as to accommodate axial separation from encoder 560, and is positioned in an aperture 585 in the circumferential surface of axial portion 588 of first carrier ring 580 which is attached to flange 526 in a manner similar to rings 380 and 480 in FIGS. 5 and 6, respectively. Ring 580 has inboard and outboard radial portions 582 and 584, respectively, and it has inboard and outboard axial portions 586 and 588, respectively.

Figure 8:
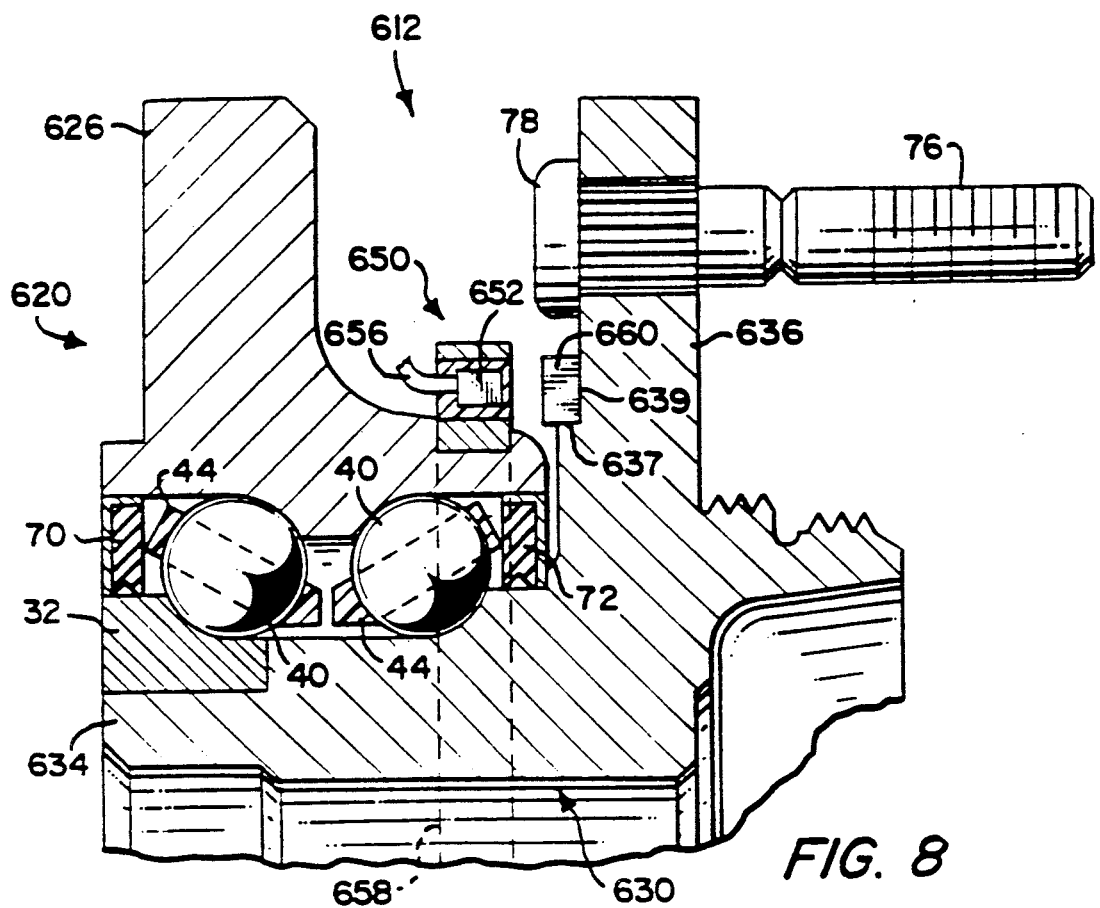
FIG. 8 is a sectional view of a bearing assembly having a sensor assembly integrated into an easily removable ring which is clipped onto the outer race, and an axially-separated annular encoder ring mounted on the inner race.
Figure 9:
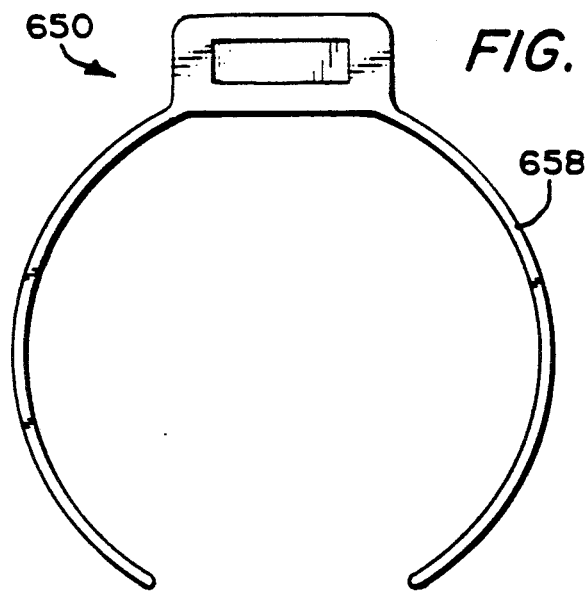
FIG. 9 is an axial end view of the removable ring shown in FIG. 8, taken along line 9—9 of FIG. 8.

Turning now to FIGS. 8 and 9, a bearing assembly 612 comprises an inner race 630 (similar to inner race 330 in FIG. 4), an outer race 620 (similar to outer race 320 in FIG. 4), a sensor assembly 650 which is integrally mounted in an easily removable ring 658 (see FIG. 9, also) which clips onto outer race 620 of the bearing assembly. Sensor assembly 650 is radially aligned with and axially separated from an encoder 660 which is positioned on the inboard side of flange 636 on a shoulder 637 formed in a recess 639.

Alternatively, encoder 660 could be attached to flange 636 with an adhesive.

We claim:
1. A wheel bearing assembly comprising:
a first race having an outer surface including a recess;
a second race having a flange projecting radially outwardly for mounting a wheel, said second race being rotatable relative to said first race;
an encoder attached to said flange of said second race; and
a sensor assembly comprising a ring removably mounted in said recess of the first race and a detector mounted in said ring, said sensor assembly being aligned with said encoder so as to provide an output signal indicative of the rotational speed of said second race relative to said first race.

2. A wheel bearing assembly according to claim 1, wherein said flange has multiple axially-oriented apertures therethrough, said apertures being spaced circumferentially around said flange so as to accommodate multiple lug studs providing means for attaching said flange to a rotatable component.

3. A wheel bearing assembly according to claim 1, said wheel bearing assembly further comprising multiple rolling elements positioned between said first and second races.

4. A wheel bearing assembly according to claim 3, wherein said rolling elements are retained by a retainer ring.

5. A wheel bearing assembly according to claim 3, wherein said rolling elements are retained by a cage.

6. A wheel bearing assembly according to claim 3, said wheel bearing assembly further comprising two seal members enclosing said rolling elements.

7. A wheel bearing assembly according to claim 1, wherein said sensor assembly further comprises an integrated circuit chip having electrical or electronic means for compensating said output signal for external factors such as temperature, stress, and aging.

8. A wheel bearing assembly according to claim 1, wherein said sensor assembly utilizes a variable reluctance detector.

9. A wheel bearing assembly according to claim 1, wherein said sensor assembly comprises;
a permanent magnet; and
a Hall-effect detector.

10. A wheel bearing assembly according to claim 1, wherein said encoder comprises an annular ring having alternate North and South poles magnetized thereon, and said sensor assembly utilizes a Hall-effect detector.

11. A wheel bearing assembly according to claim 1, wherein said encoder and said sensor assembly are radially aligned and axially separated.

12. A wheel bearing assembly according to claim 1, wherein said ring includes resilient arcuate end portions which engage said outer surface of the first race to removably hold the ring in said recess.

13. A wheel bearing assembly according to claim 1, wherein said ring includes a non-circular portion engageable with said outer surface of the firs race such that rotation of the ring relative to the first race is resisted.

14. A wheel bearing assembly according to claim 13, wherein said ring includes a substantially straight portion housing the detector and at least one arcuate end portion engaging the outer surface of the first race.

15. A wheel bearing assembly according to claim 1, wherein said encoder is mounted directly on said flange of the second race.

* * * * *